Patented Feb. 14, 1933

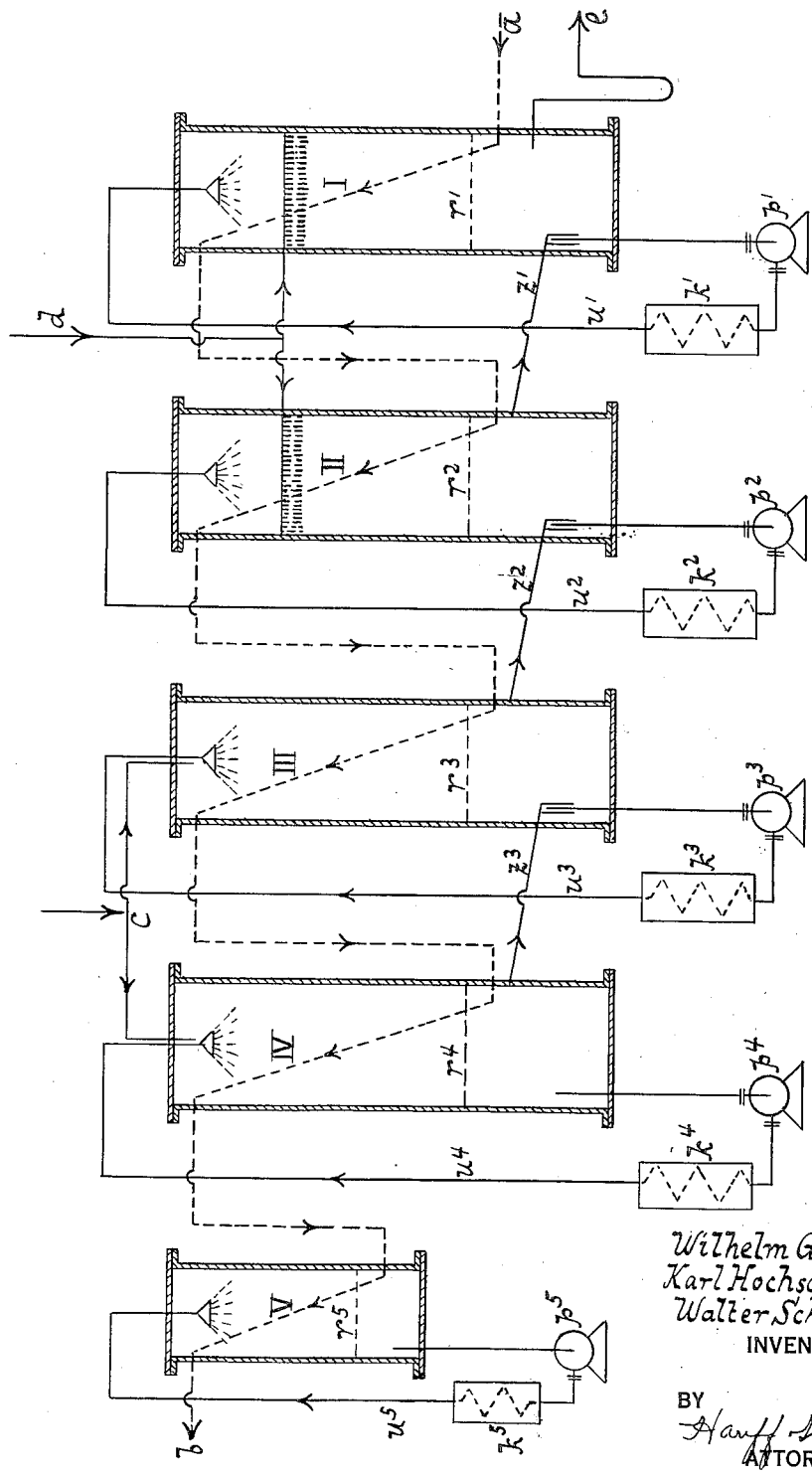
Wilhelm Gaus
Karl Hochschwender
Walter Schunck
INVENTORS

1,897,725

UNITED STATES PATENT OFFICE

WILHELM GAUS, KARL HOCHSCHWENDER, AND WALTER SCHUNCK, OF LUDWIGS-HAFEN-ON-THE-RHINE, GERMANY, ASSIGNORS TO I. G. FARBENINDUSTRIE AKTIEN-GESELLSCHAFT, OF FRANKFORT-ON-THE-MAIN, GERMANY, A CORPORATION OF GERMANY

PROCESS FOR EXTRACTING CARBON DIOXID FROM GASEOUS MIXTURES AND FORMING ALKALINE CARBONATES

Application filed May 16, 1927, Serial No. 191,775, and in Germany May 28, 1926.

We have found that carbon dioxid may be advantageously extracted from gases containing the same, by means of aqueous ammonia, by allowing the gases to flow through a succession of scrubbing towers, in each of which the scrubbing liquid is circulated, accompanied by cooling, by means of a pump, a small portion of the circulated solution being continuously transferred to the preceding tower, in relation to the direction of flow of the gas, whilst ammonia gas or strong aqueous ammonia or water is continuously supplied to one or more of the first towers, and water, or a neutral or faintly acid scrubbing solution, is continuously supplied to the last tower or towers. A solution of ammonium carbonate can then be drawn off continuously from the first tower. By regulating the supply of ammonia and water, it is possible in this way to obtain ammonium carbonate solutions of any desired concentration. Generally speaking it is advantageous to supply the ammonia not to the first tower in relation to the direction of flow of the gas, but to the second tower, in order to ensure that all the ammonia will be combined with carbon dioxid.

The process according to the present invention may be carried out, for example, by forcing by means of a blower or the like a crude gaseous mixture which is to be used in the synthetic manufacture of ammonia and consisting of hydrogen, nitrogen, a little carbon monoxid and about 30 per cent of carbon dioxid, through several scrubbing towers filled with Raschig rings, and into which aqueous ammonia of 27 per cent strength, such as is obtained by scrubbing the catalytically treated gases, is introduced. The gas in the several towers may be passed in the same direction as the liquid, but it is more preferable to pass it in the reverse direction, that means in counter-current thereto. In order to utilize the absorbent solution to the fullest possible extent, and to obtain the resulting ammonium carbonate solution with a definite concentration, the scrubbing liquid is circulated in each of the several towers by pumping, cooling apparatus being interposed in each case in order to remove the heat generated by the combination of ammonia with carbon dioxid. In order to remove any ammonia that may have been carried away by the gas, the latter is scrubbed in other towers with water or neutral or acid liquor circulated through them, the final traces of carbon dioxid being eliminated at the same time. The heat generated in these towers is also removed by cooling means during the circulation. Any ammonia still retained by the gas after the scrubbing with water, is eliminated by finally passing the gas through a tower where it is scrubbed with dilute sulphuric acid. When purified in this manner, the gas mixture is practically free from all ammonia and carbon dioxid. A portion of the ammonium carbonate liquor formed in the several towers is passed, through overflows, into the preceding tower, in relation to the direction of flow of the gases, and the finished solution is finally drawn off from the tower into which the gas is first admitted. By regulating the supply of ammonia and water, the liquor can be brought to the concentration which is most suitable in view of its subsequent application, such as decomposition by various salts,—gypsum, calcium nitrate and the like.

In the accompanying drawing we have shown by way of example diagrammatically, means according to our invention for carrying out the process but the invention is not restricted thereto. I, II, III, IV and V are scrubbing towers, the lower ends of which are arranged as liquid collecting tanks; $r^1$, $r^2$, $r^3$, $r^4$ and $r^5$ are grids on which suitable fillers, such as Raschig rings, are supported; a feed pipe $d$ is provided for supplying aqueous ammonia to towers I and II, a feed pipe $c$ for supplying water or the aforesaid scrubbing solutions to towers III and IV. V is the sulfuric acid scrubber. The gas is admitted at $a$ and discharged at $b$, and the ammonium carbonate solution produced leaves the apparatus at $e$. $p^1$, $p^2$, $p^3$, $p^4$ and $p^5$ are pumps for circulating the scrubbing liquid in each of the towers; $k^1$, $k^2$, $k^3$, $k^4$, $k^5$ are coolers serving for cooling the liquid circulated in each tower; $u^1$, $u^2$, $u^3$, $u^4$, $u^5$ are circulation pipes for the liquids in each tower, and $z^1$, $z^2$, $z^3$ are overflow pipes, through which part of the scrubbing liquid in each of the towers I, II, III and IV is transferred to the preceding tower, considered in relation to the direction of flow of gas.

What we claim is:

1. The process for extracting carbon dioxid from gases containing the same and forming alkaline carbonates, which comprises passing said gases through a succession of washing towers, in each of which a wash liquid is circulated with interposed cooling, while continuously admitting ammonia into one of the first towers, continuously admitting an aqueous nonalkaline liquid into the last tower where the gas leaves, continuously withdrawing ammonium carbonate solution of a desired concentration from the first tower and continuously transferring a portion of the circulated liquid to each preceding tower of the series, considered in relation to the direction of the flow of gas.

2. The process for extracting carbon dioxid from gases containing the same and forming alkaline carbonates, which comprises passing said gases through a succession of washing towers, in each of which a wash liquid is circulated with interposed cooling, while continuously admitting ammonia into one of the first towers, continuously admitting an aqueous nonalkaline liquid into the last tower where the gas leaves, continuously withdrawing ammonium carbonate solution of a desired concentration from the first tower, continuously transferring a portion of the circulated liquid to each preceding tower of the series, considered in relation to the direction of the flow of gas, and freeing the purified gases from any traces of ammonia by scrubbing with dilute sulfuric acid.

In testimony whereof we have hereunto set our hands.

WILHELM GAUS.
KARL HOCHSCHWENDER.
WALTER SCHUNCK.